Figure 1:
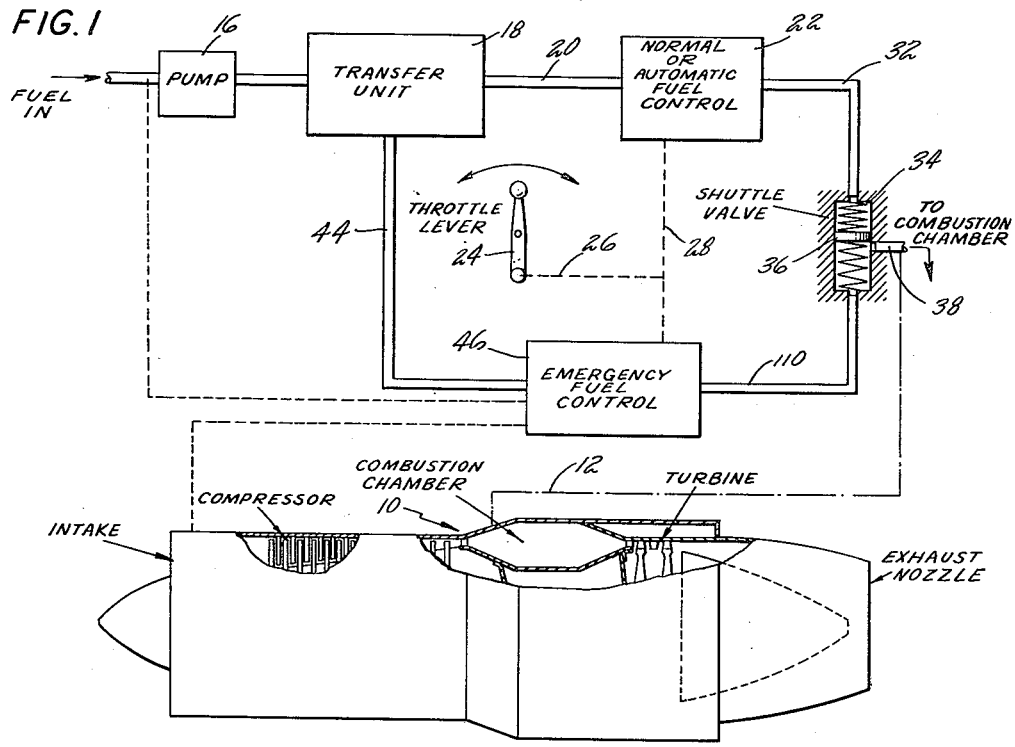

Nov. 20, 1956   S. G. BEST, JR   2,771,130
EMERGENCY FUEL CONTROL SYSTEM
Filed Dec. 30, 1952

INVENTOR
STANLEY G. BEST JR.
BY *Leonard F. Weklind*
ATTORNEY

2,771,130
EMERGENCY FUEL CONTROL SYSTEM

Stanley G. Best, Jr., Manchester, Conn., assignor to United Aircraft Corporation, East Hartford, Conn., a corporation of Delaware Application December 30, 1952, Serial No. 328,767

16 Claims. (Cl. 158—36.3)

This invention relates to fuel control systems and particularly to emergency control systems for power plants such as a gas turbine.

It is an object of this invention to provide a simple but effective emergency control system for turbine power plants.

Another object of this invention is to provide a fuel control of the type described which responds primarily to throttle lever position and pressure altitude for fuel regulation.

A still further object of this invention is to provide a fuel control system comprising a pair of valves operatively connected in parallel and supplied with a substantially constant flow source, the valves being responsive to throttle position and pressure altitude respectively so that the total pressure drop across the valves can be used to control the pressure drop across a main throttle valve.

Figure 2:
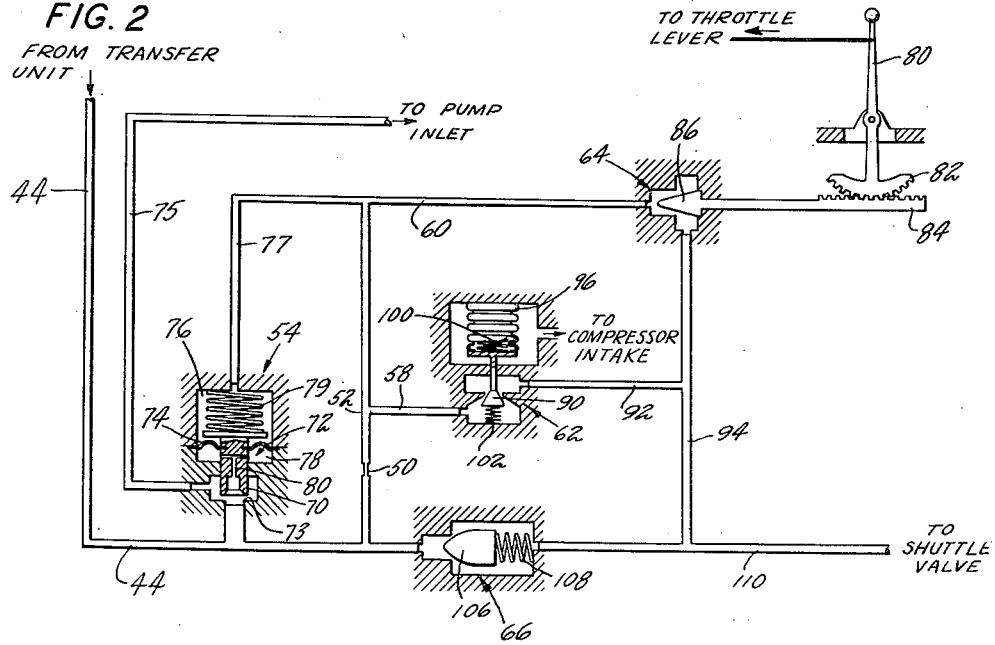

These and other objects of this invention will become readily apparent from the following detail description of the drawing in which:

Fig. 1 is a schematic illustration of a fuel system for a turbine power plant showing the normal and emergency fuel control systems and their interconnections; and Fig. 2 is a schematic illustration of the emergency fuel control system of this invention.

Referring to Fig. 1, a turbine power plant 10 is illustrated as having the usual air intake, compressor, combustion chamber, turbine and exhaust nozzle. The combustion chamber is provided with a controlled flow of fuel via the line 12. The entire fuel system for the turbine power plant comprises a pump 16 which provides fuel under pressure to a transfer unit 18. The transfer unit normally supplies fuel via the line 20 to the normal or automatic fuel control 22. The normal or automatic fuel control may be controlled by means of a pilot's throttle lever 24 which is connected to the normal fuel control as schematically illustrated by the dotted lines 26 and 28. When in operation the normal fuel control then supplies fuel via the line 32 to the shuttle valve 34 whose piston 36 would be moved downwardly by the pressure in the line 32 thereby supplying fuel to the line 38 and the line 12 to the combustion chamber.

The transfer unit may be caused to respond to any number of different conditions. In other words, it may respond to the failure of various portions of the normal fuel control or it might readily be manually controllable or both so as to cut off the flow of fuel in the line 20 and direct it into the line 44 and to the emergency fuel control 46. The emergency fuel control comprises the primary subject matter of this invention and is more clearly illustrated in Fig. 2. As seen herein, the line 44 leads from the transfer unit and provides fuel under pressure for the emergency control. In general, the emergency fuel control comprises a number of major elements. An orifice 50 is provided in the line 52 and a pressure regulator, generally indicated at 54, maintains the pressure drop across the orifice 50 at a constant differential. This provides a constant total flow for the two lines 58 and 60 leading to the valves 62 and 64, respectively. Valves 62 and 64 are controlling valves to control the flow of fuel through the main spring biased throttle valve 66. Generally then the valves 62 and 64 control the pressure drop across the throttle valve 66 to in turn control the flow of fuel therethrough.

Returning to the pressure regulator 54, it comprises a valve stem 70 which is carried by a piston 72 at its upper end. A diaphragm 74 separates the space surrounding the piston 72 into an upper chamber 76 and a lower chamber 78. Passage 80 within the valve stem 70 permits the pressure in chamber 78 to remain the same as that existing in line 44. Chamber 76 on the other hand is exposed to pressure existing on the downstream side of the orifice 50.

The regulating valve 54 operates in the following manner. Fuel pressure in line 44 acts on the bottom of valve stem 70 and the underside of diaphragm 74 in chamber 78 tending to unseat the valve stem 70 from the valve seat 73 and allow fuel to flow to by-pass line 75. Fuel in line 77 and the force of spring 79 act on the upper surface of diaphragm 74 and the upper surface of piston 72 tending to keep the valve stem 70 seated. Therefore, whenever the pressure in line 44 exceeds that in line 77 by an amount exceeding the force of spring 79, piston 72 will unseat valve stem 70 and by-pass fuel to line 75.

It should be added that the diaphragm 74 seals chamber 76 from chamber 78 and insures that any leakage from the valve will be from chamber 78 and not chamber 76 where a reliable regulating pressure is essential.

The orifice 50 will pass a given amount of fuel per unit of time at a given pressure drop thereacross. The pressure regulator 54 maintains a constant pressure differential between line 44 and lines 58 and 60 so that the latter lines are supplied with a constant flow.

The control valves 62 and 64 thus being supplied with a constant flow operate to vary the pressure drop across the main throttle valve 66 which is so contoured that for every pressure drop across this valve there will be a definite flow and the relationship of pressure drop to flow will be a straight line function. It is then apparent that by regulating the pressure drop across the valve 66, fuel flow past the valve and to the power plant will be regulated. The valve 64 is the primary means for adjusting the pressure drop across the throttle valve 66. The pilot's throttle lever, illustrated in Fig. 1, is operatively connected to the lever 80 which has at one end thereof a gear segment 82 engaging a rack 84 to vary the position of the valve stem 86 of the valve 64. Varying the position of the valve stem 86 varies the pressure drop across the valve 64 thus regulating the pressure drop across the throttle valve 66.

The valve 62 is utilized to bias the controlled pressure drop created by valve 64. The valve 62 responds to the temperature and pressure (or pressure alone) existing at the compressor intake. The temperature and/or pressure or throttle lever position are parameters of power plant operation. Some other parameter such as compressor discharge pressure or speed may be utilized should any other flow control characteristics be desired over a range of power plant operation. By reference to the parameters mentioned applicant does not limit himself to these alone since other variable may be used. The valve 62 comprises a stem 90 which controls the flow of fuel from the line 58 so the line 92 and then to the line 94. The upper end of the stem is operatively connected to a bellows 96 which is filled for example with nitrogen at standard sea level conditions such that any variation in temperature or pressure of the air surrounding the bellows will cause suitable movement in the valve stem 90. The valve stem 90 is preloaded in both directions by springs 100 and 102. The valve 62 then in effect biases pressure drop across valve 64 in order to correct for changes in ambient temperature and pressure.

It will then be apparent that the valves 62 and 64 are operatively connected in parallel so as to cooperate to control the pressure drop across the throttle valve 66. Variations in this pressure drop will cause the element 106 of the valve 66 to move in either direction against the pressure of the spring 108. Fuel from the throttle valve 66 flows into the line 110 and thence to the shuttle valve of Fig. 1. The shuttle valve piston 36 is in the position (Fig. 1) where the emergency fuel control is supplying fuel to the power plant. Similar results (of emergency control) can be obtained with the valves 62 and 64 connected in series instead of in parallel and/or with the throttle valve 66 contoured to give other than a straight line relationship between fuel flow and pressure drop.

Furthermore, the valves 62, 64 and 66 can be contoured so that fuel flow is made proportional to the product of the two parameters which determine the positions of valve stems 90 and 86. This can be done for either a series or parallel connection wtih respect to valves 62 and 64.

Thus where a fuel flow from lines 44 to 110 is desired to be proportional to the product of the parameters mentioned the following can be shown where:

$W_f$ = fuel flow
$X$ = value of one parameter
$Y$ = value of other parameter
$f$ = function of
$\Delta P$ = pressure differential or pressure drop The desired fuel flow can be expressed as $$W_f = XY$$

or $$\log W_f = \log X + \log Y$$

The valves 62 and 64 are then contoured such that $\Delta P$ across from lines 44 to 110 is a function of $(\log X + \log Y)$ i. e., $$\Delta P = f(\log X + \log Y)$$
$$= f(\log XY)$$
$$= f(\log W_f)$$

The particular relationship of $\Delta P$ to $XY$ or $\log XY$ can readily be plotted on a curve or the relationship for any given area of the valves relative to $\Delta P$ can be determined over a range. This relationship then may be utilized to determine the contour for the throttle valve 66 so that this same relationship is obtained between $\Delta P$ and total fuel flow ($W_f$) htrough the valve so that:

$$\Delta P = f(\log W_f)$$

For a parallel connection of controlling valves such as valves 62 and 64 shown in Fig. 2, the areas of these valves are proportioned to the logs of X and Y so that the sum of the areas is proportioned to log X plus log Y.

For a system where the valves 62 and 64 are connected in series (but in parallel with valve 66) the valves are contoured such that the squares of their areas are inversely proportional to the logs of X and Y so that the sum of the pressure drops will be function of log X plus log Y.

Thus with the valves contoured in the manner described either a series or parallel combination of valves 62 and 64 can produce the desired controlling result on the throttle valve 66. The use of a parallel or series combination of valves 62 and 64 is primarily dependent upon plumbing convenience and on manufacturing capacity. Thus the parallel combination would use smaller orifices while the series connection would use larger orifices. The latter combination would permit greater tolerances in manufacture.

As a result of this invention it is apparent that a simple and reliable emergency fuel control has been provided which can readily take over the control of a turbine power plant in the event that its primary or normal fuel control system becomes inoperative.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In combination, a power plant having a combustion chamber, a source of fuel under pressure, a throttle valve operatively connected between said source and said combustion chamber, said valve being resiliently biased toward a closed position, at least one other valve operatively connected in parallel with said throttle valve, means for metering the amount of flow to said other valve, means for maintaining the pressure drop across said metering means at a constant, and means for varying the opening of said other valve thereby varying the pressure on the downstream side of said throttle valve and automatically modifying the effect of the resilient bias and varying the opening of said throttle valve.

2. In combination, a power plant having a combustion chamber, a source of fuel under pressure, a throttle valve operatively connected between said source and said combustion chamber, said valve being resiliently biased toward a closed position and being responsive to the pressure differential across said valve, at least two valves operatively connected in parallel with said throttle valve, means for metering the amount of flow to said two valves, means for maintaining the pressure drop across said metering means at a constant, and pressure responsive means for varying the opening of one of said two valves and thereby varying the pressure on the downstream side of said throttle valve and varying the opening thereof.

3. In a combination according to claim 2 including means for varying the opening of the other of said two valves.

4. In a combination according to claim 2 wherein said metering means comprises an orifice.

5. A fuel system for a power plant including a throttle valve receiving fuel from a source and having and outlet lines connected thereto, a plurality of valves connected to said lines and in parallel with said throttle valve, means providing a constant flow to said plurality of valves including mechanism for metering flow thereto, means for maintaining a constant pressure drop across said metering means, the opening of each of said plurality of valves being controlled in response to the instantaneous valve of a parameter of power plant operation and being contoured whereby the pressure drop across said valves is a logarithmic function of the values of said parameters, and a spring pressed valve member forming a part of said throttle valve, said member being contoured to produce a flow proportional to the pressure drop produced by said plurality of valves.

6. A fuel system for a power plant including a throttle valve receiving fuel from a source and having intake and outlet lines connected thereto, a plurality of valves connected to said lines and in parallel with said throttle valve, means providing a constant flow to said plurality of valves including mechanism for metering flow thereto, means for maintaining a constant pressure drop across said metering means, the opening of said plurality of valves being controlled in response to parameters of power plant operation and being logarithmically contoured in proportion to a range of values of said parameters, said valves being operatively connected together whereby the pressure drop produced by said plurality of valves is a function of the product of said parameters, and a spring pressed flow controlling member forming a part of said throttle valve and movable in response to changes in said pressure drop.

7. A fuel system for a power plant including a throttle valve receiving fuel from a source and having intake and outlet lines connected thereto, a plurality of valves connected to said lines and in parallel with said throttle valve, means providing a constant flow to said plurality of valves including mechanism for metering flow thereto, means for maintaining a constant pressure drop across said metering means, said plurality of valves including members movable in response to individual parameters of power plant operation and producing a pressure drop commensurate with a logarithmic function of the value of said parameters, and a spring pressed flow controlling member forming a part of said throttle valve movable in response to changes in the pressure drop across said plurality of valves.

8. A fuel system for a power plant including a throttle valve receiving fuel from a source and having intake and outlet lines connected thereto, a plurality of valves connected to said lines and in parallel with said throttle valve, means providing a constant flow to said plurality of valves including mechanism for metering flow thereto, means for maintaining a constant pressure drop across said metering means, the opening of said plurality of valves being controlled in response to parameters of power plant operation and being contoured whereby the pressure drop across said valves is a logarithmic function of the value of said parameters, and a spring pressed valve member forming a part of said throttle valve, said member being contoured to produce a flow which is an antilogarithmic function of the pressure drop produced by said plurality of valves, whereby the total flow output of said fuel system is proportioned to a function of the product of the values of said parameters.

9. A fuel system for a power plant including a throttle valve receiving fuel from a source and having intake and outlet lines connected thereto, a plurality of valves connected to said lines and in parallel with said throttle valve, means providing a constant flow to said plurality of valves including mechanism for metering flow thereto, means for maintaining a constant pressure drop across said metering means, each of said valves having an opening whose area is controlled by a movable valve stem, each stem being movable an amount proportional to the value of a parameter of power plant operation and each stem being contoured whereby the pressure drop across said plurality of valves is a logarithmic function of the values of the parameters, and a spring pressed valve member forming a part of said throttle valve, said member being contoured to produce a flow proportional to the pressure drop produced by said plurality of valves.

10. In combination with a power plant having a combustion chamber, a source of fuel under pressure including a line connected to said chamber, a spring pressed throttle valve operatively connected in said line between said source and said combustion chamber, said spring biasing said throttle valve toward a closed position and said valve being positioned in response to the pressure differential across said valve, a plurality of valves connected in parallel with said spring pressed valve, means for metering a constant flow of fuel from said source to said plurality of valves, and means for varying the opening of at least one of said plurality of valves to control the pressure on the downstream side of said throttle valve to automatically modify the effect of said spring bias on said throttle valve to vary the opening of said throttle valve.

11. A combination according to claim 10 wherein at least one of said plurality of valves has an opening which varies in response to a variable of power plant operation.

12. A combination according to claim 10 wherein at least one of said plurality of valves is manually variable.

13. A combination according to claim 11 wherein at least one of said plurality of valves is manually variable.

14. A fuel system for a power plant including a spring pressed throttle valve receiving fuel from a source and having intake and outlet lines connected thereto, said spring biasing said throttle valve toward closed position and said valve being positioned in response to the pressure differential across said valve, a plurality of valves connected to said lines in parallel with said throttle valve, the flow through said throttle and plurality of valves determining the total flow in said outlet line, means providing a constant flow to said plurality of valves including mechanism for metering the flow thereto, means for maintaining constant the pressure drop across said metering mechanism, and means for varying the opening of said plurality of valves whereby the pressure on the downstream side of said throttle valve is varied to automatically modify the effect of said spring bias to vary the opening of said throttle valve.

15. A fuel system for a power plant including a throttle valve receiving fuel from a source and having intake and outlet lines connected thereto, a spring biasing said throttle toward a closed position, said spring biasing said throttle valve toward closed position and said throttle valve being positioned in response to the pressure differential across said throttle valve, a plurality of valves connected to said lines in parallel with said throttle valve, the flow through said throttle and plurality of valves determining the total flow in said outlet line, means providing a constant flow to said plurality of valves including mechanism for metering the flow thereto, means for maintaining constant the pressure drop across said metering mechanism comprising a pressure regulator operatively connected to said mechanism, and means for varying the outlet pressure of said plurality of valves comprising a pressure responsive device operatively connected to and varying the opening of at least one of said valves thereby varying the pressure on the downstream side of said throttle valve to automatically modify the effect of said spring bias to vary the opening of said throttle valve.

16. A fuel regulating mechanism for a power plant including a throttle valve receiving fuel from a source under pressure and having intake and outlet lines connected thereto, a spring biasing said throttle valve toward a closed position, said throttle valve being positioned in response to the pressure differential across said throttle valve, a system having a plurality of orifices operatively connected together, said system also including at least one fixed orifice and means for regulating the pressure drop across said fixed orifice, said fixed orifice being connected in series with each of the remainder of said orifices, the total pressure drop across said system being determined by the aggregate of the openings of said orifices, and means connecting said system in parallel with said throttle valve whereby the pressure drop across said system regulates the pressure on the downstream side of said throttle valve and hence the amount of flow across said throttle valve including operative connections to said intake and outlet lines, variation of the pressure on the downstream side of said throttle valve automatically varying the force opposing the bias of said spring and the opening of said throttle valve.

References Cited in the file of this patent

UNITED STATES PATENTS

| | | |
|---|---|---|
| 2,503,048 | Ifield | Apr. 4, 1950 |
| 2,508,260 | Holley | May 16, 1950 |
| 2,596,815 | Keil | May 13, 1952 |
| 2,598,674 | Burgess | June 3, 1952 |
| 2,617,477 | Isreeli | Nov. 11, 1952 |

FOREIGN PATENTS

| | | |
|---|---|---|
| 959,467 | France | Oct. 3, 1949 |